US006766364B2

(12) United States Patent
Moyer et al.

(10) Patent No.: US 6,766,364 B2
(45) Date of Patent: Jul. 20, 2004

(54) TEMPLATE BASED CONFIGURATION AND VALIDATION OF A NETWORK FOR ENABLING A REQUESTED SERVICE TO BE COMPATIBLE WITH THE PREVIOUSLY ENABLED SERVICES

(75) Inventors: Stanley L. Moyer, Mendham, NJ (US); Simon Tsang, Jersey City, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 206 days.

(21) Appl. No.: 10/047,255

(22) Filed: Jan. 15, 2002

(65) Prior Publication Data

US 2003/0135596 A1 Jul. 17, 2003

(51) Int. Cl.[7] ............................................... G06F 15/16
(52) U.S. Cl. ...................... 709/221; 709/222; 709/220; 370/466; 370/352
(58) Field of Search ................................ 709/220–222, 709/229; 370/466, 410, 351–352; 707/10

(56) References Cited

U.S. PATENT DOCUMENTS

| | | | |
|---|---|---|---|
| 5,838,918 A | | 11/1998 | Prager et al. .......... 395/200.51 |
| 5,872,928 A | | 2/1999 | Lewis et al. ........... 395/200.52 |
| 6,131,095 A | * | 10/2000 | Low et al. ..................... 707/10 |
| 6,317,438 B1 | * | 11/2001 | Trebes, Jr. ................... 370/466 |
| 6,466,972 B1 | | 10/2002 | Paul et al. ................... 709/222 |
| 2001/0010690 A1 | * | 8/2001 | Shen ........................... 370/352 |
| 2002/0026503 A1 | * | 2/2002 | Bendinelli et al. .......... 709/220 |
| 2002/0161888 A1 | * | 10/2002 | McGuire ..................... 709/226 |
| 2002/0178380 A1 | * | 11/2002 | Wolf et al. .................. 713/201 |
| 2003/0009567 A1 | * | 1/2003 | Farouk ........................ 709/229 |
| 2003/0097427 A1 | * | 5/2003 | Parry ........................... 709/220 |

\* cited by examiner

Primary Examiner—Wen-Tai Lin
(74) Attorney, Agent, or Firm—Glen R. Farbanish (57) ABSTRACT

Customer premise network configuration to enable a new service within the network is provided by a network configuration manager. The network configuration manager is either manually or automatically invoked upon a new service being used in the network. The configuration manager obtains a service template for the service, which template provides generic end-to-end requirements for enabling the service. A configuration generator generates vendor-neutral device-configuration settings from the service template. A service configuration validator module then validates the service. Finally, an adaptor module translates the vendor-neutral device-configuration settings to vendor specific configuration settings corresponding to the devices in the network and configures the devices.

18 Claims, 5 Drawing Sheets

TEMPLATE BASED CONFIGURATION AND VALIDATION OF A NETWORK FOR ENABLING A REQUESTED SERVICE TO BE COMPATIBLE WITH THE PREVIOUSLY ENABLED SERVICES

BACKGROUND OF OUR INVENTION

1. Field of the Invention

Our invention relates generally to network configuration management. More particularly, our invention relates to end-to-end configuration management and configuration validation of customer premise networks to correctly enable new services being executed within these networks.

2. Description of the Background

Figure 1:
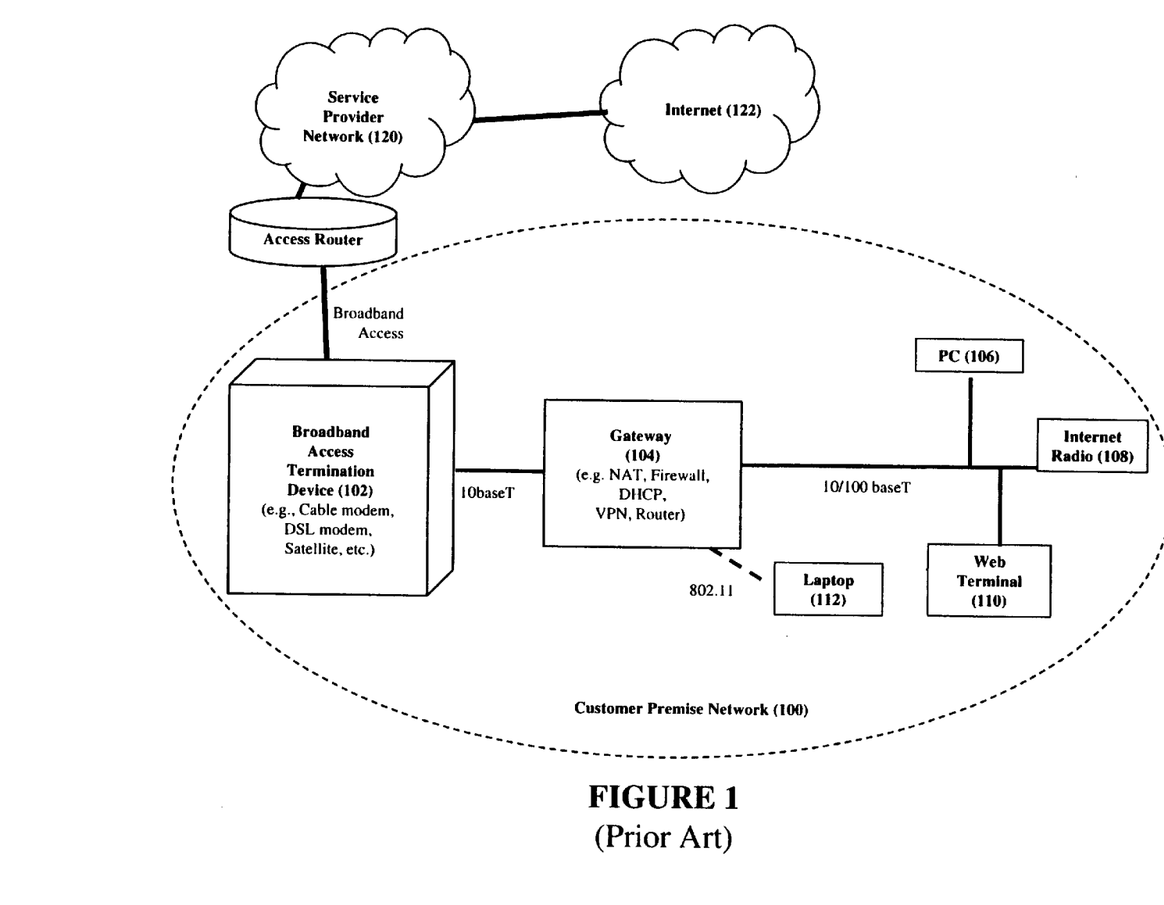
FIG. 1 depicts prior art customer premise network architecture, to which our invention is applicable, the architecture including a gateway and one or more user devices that require configuration before services and applications will correctly operate.

Users are continuously executing from within their customer premise networks (e.g., small office/home office networks, small enterprise networks, home networks, etc.) new types of applications and services (hereinafter collectively referred to as services) including: web server hosting, multi-player gaming, MP3 file sharing, video and voice conferencing, and IP-based services like telnet, FTP, and ssh. Coincident with these services, users are also employing new technologies in theirs networks such as broadband gateways/routers (hereinafter broadly referred to as gateways). As shown in FIG. 1, a gateway 104 resides between a broadband access termination device 102 (e.g., cable modem, DSL modem, satellite), which provides access to a service provider network 120, and user devices including a PC 106, a web terminal 110, an internet radio 108, a laptop 112, etc. Gateways provide differing functions including firewall protection, network address translation (NAT), router functionality, VPN functionality, and quality of service assurance. The customer premise network 100, as seen in FIG. 1, may be connected, through an access router, to a private network, such as service provider network 120, and to a public network, such as the Internet 122.

Of concern here is the configuration management of these customer premise networks 100 when a user starts using new services like those described above. Often, before these services can correctly function, the user must correctly configure the user devices 106–112 and gateway 104. For example, the user devices may require configuration of the IP-layer (and above) functionality. Of greater concern is configuring gateway functionality. For example, NATs and firewalls break the traditional end-to-end model of IP networks and therefore make it impossible for the IP-based peer-to-peer and sever-based types of services described above to correctly operate (note that these services require external devices to access the home network) without first correctly configuring this functionality. Specifically, NATs and firewalls restrict access to external devices unless the correct entries are first made in the NAT's port forwarding table and the correct "holes" are first made in the firewall.

As such, a home user must correctly configure the user devices and gateway before these new service types will correctly execute. Unfortunately, the configuration of gateways and user devices is a nontrivial task that the average user is not equipped to perform. Failure to correctly configure these devices when invoking new services cannot only be difficult to debug, it might also create security holes to which the user is unaware.

Prior solutions address customer premise network configuration management but present several problems. First, prior solutions are associated with and only address a particular device (like a gateway 104 or PC 106) within the network 100. As such, these solutions fail to take an end-to-end view of the network and therefore, can fail to completely enable a new service and can create conflicting/incompatible configurations. A second problem is that some services require configuration of devices and servers external to the customer premise network 100, which configurations cannot be performed by the prior solutions because they only operate from within the network. A third problem is that prior solutions fail to ensure that configuring the network for one service does not disable another service. Lastly, these solutions are vendor specific and cannot address any device.

SUMMARY OF OUR INVENTION

Accordingly, it is desirable to provide a method and apparatus to perform end-to-end network configuration management of a customer premise network, thereby overcoming the above and other disadvantages of the prior art. In accordance with a first embodiment of our invention, a network configuration manager performs end-to-end configuration management and configuration validation of the customer premise network to enable a requested service to operate within the network.

Upon receiving a request to configure a specific service, our inventive system obtains a service template, from a plurality of service templates, that corresponds to the requested service. Service templates provide vendor-neutral end-to-end requirements for enabling a particular service within a customer premise network. The system uses the obtained service template to invoke a configuration generator that generates vendor-neutral device-configuration settings for the device types that can comprise a network. The system next invokes a configuration validator module to validate the network for the requested service. For example, the configuration validator determines if the generated vendor-neutral device-configuration settings for the requested service and the device-configuration settings for all priorly enabled services within a network meet the service requirements, as specified by the service templates, for the services enabled within the network. Finally, the system invokes an adaptor module that translates the vendor-neutral device-configuration settings determined for the requested service to vendor-specific device-configuration settings and communicates these settings to the particular devices within the customer premise network to enable the service. Similar to the above, the network configuration manager can also disable a service within the customer premise network.

In accordance with a first specific embodiment of our invention, the network configuration manager configures the customer premise network for a specific service upon receiving a user invoked configuration request through a web interface. In accordance with a second specific embodiment of our invention, a packet sniffer is deployed within the customer premise network. The packet sniffer monitors traffic emanating from the network, watching for IP packets pertaining to specific services. Upon detecting a service that has not been priorly enabled, the packet sniffer requests the network configuration manager to configure the network to enable the detected service. Lastly, in accordance with a third specific embodiment of our invention, a user accesses an external system for a specific service, which external system generates a request to the network configuration manager to configure the network for the service.

DETAILED DESCRIPTION OF OUR INVENTION

Figure 2:
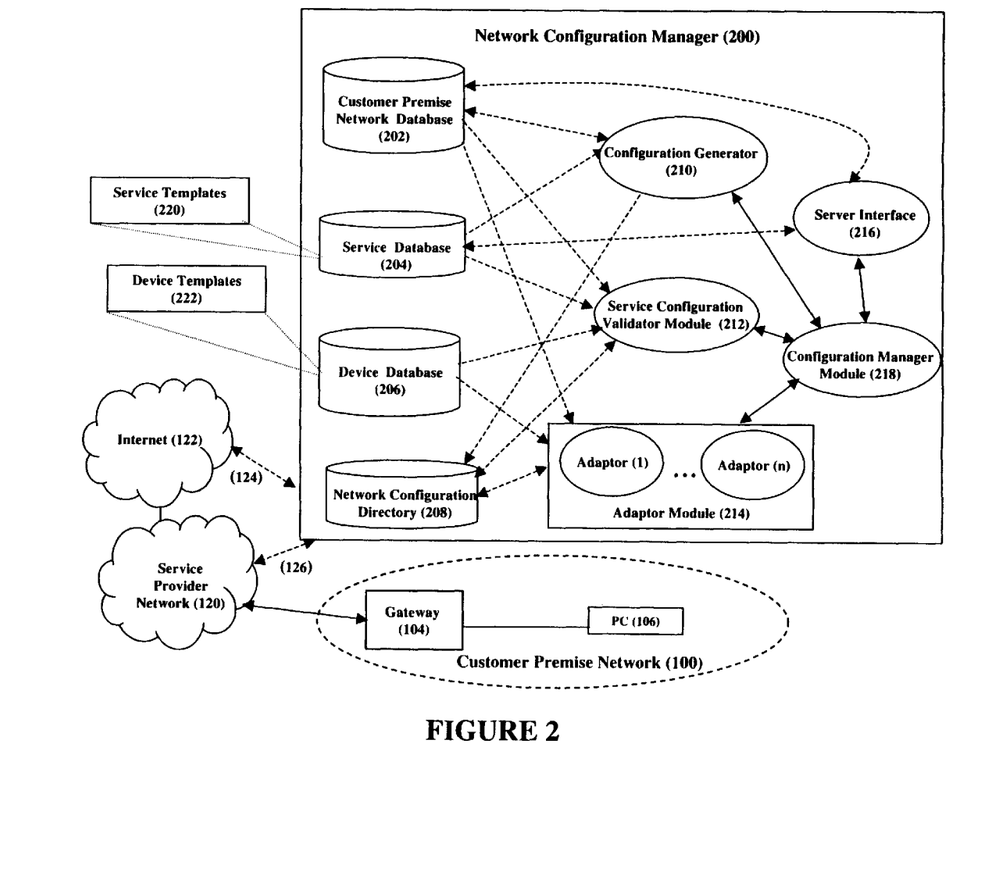
FIG. 2 depicts an illustrative embodiment of our invention wherein a network configuration manager performs end-to-end configuration management and configuration validation of the customer premise network to enable new services.

FIG. 2 shows a block diagram of network configuration manager 200 of our invention that performs customer premise network configuration management. Specifically, the network configuration manager 200 performs configuration management of a customer premise network 100, including the user devices 106–112 (only device 106 is shown for simplicity) and gateway 104, to enable these networks to correctly execute new peer-to-peer and server-based services. The network configuration manager is preferably located either in a public network, such as Internet 122, or in a private network, such as a service provider's network 120, as shown by the dashed arrows 124 and 126 respectively.

Broadly, the network configuration manager 200 comprises a server interface 216, a configuration manager module 218, a configuration generator 210, a service configuration validator module 212, an adaptor module 214, a customer premise network database 202, a service database 204, a device database 206, and a network configuration directory 208. The server interface 216 provides a network interface through which the network configuration manager 200 can be invoked. Upon receiving a configuration request, the server interface calls the configuration manager module 218, which controls the workflow execution of the configuration generator 210, the service configuration validator 212, and the adaptor module 214.

The customer premise network database 202 maintains entries for all users serviced by the network configuration manager 200 and specifically, maintains a list of the devices 104–112 within a given customer premise network, the corresponding configurations of these devices (e.g., IP addresses), and a list of the services installed and running in this network. The service database 204 maintains a list of the available services the network configuration manager is capable of configuring and a list of corresponding service templates 220. Service templates provide vendor neutral end-to-end requirements for enabling a particular service within a customer premise network. For example, a service template can provide the NAT port forwarding requirements and firewall requirements for a particular service (e.g., the port numbers and protocols used by the service). The device database 206 maintains device templates 222 for vendor specific devices. A device template provides the capabilities of a particular device and how to configure that particular device. The network configuration directory 208 maintains all vendor-neutral device-configuration settings for all services priorly enabled in a given customer premise network 100.

As such, for each service requested by a user, the configuration manager 218 invokes the configuration generator 210 to generate, from a corresponding service template, vendor-neutral device-configuration settings for the device types that can comprise a network. The configuration manager next invokes the service configuration validator module 212 to validate a newly requested service. Service validation includes determining if the vendor-neutral device-configuration settings produced by the configuration generator and the configuration settings for priorly enabled services meet the service requirements as specified by the service templates (e.g., that the new configuration settings do not conflict with or invalidate the configuration settings for services priorly enabled in a network). Finally, the configuration manager invokes the adaptor module 214 to translate the vendor-neutral device-configuration settings determined for the requested service to vendor-specific device-configuration settings and to communicate these settings to the particular devices 104–112 within a customer premise network 100 to configure these device and to enable the service.

Figure 3:
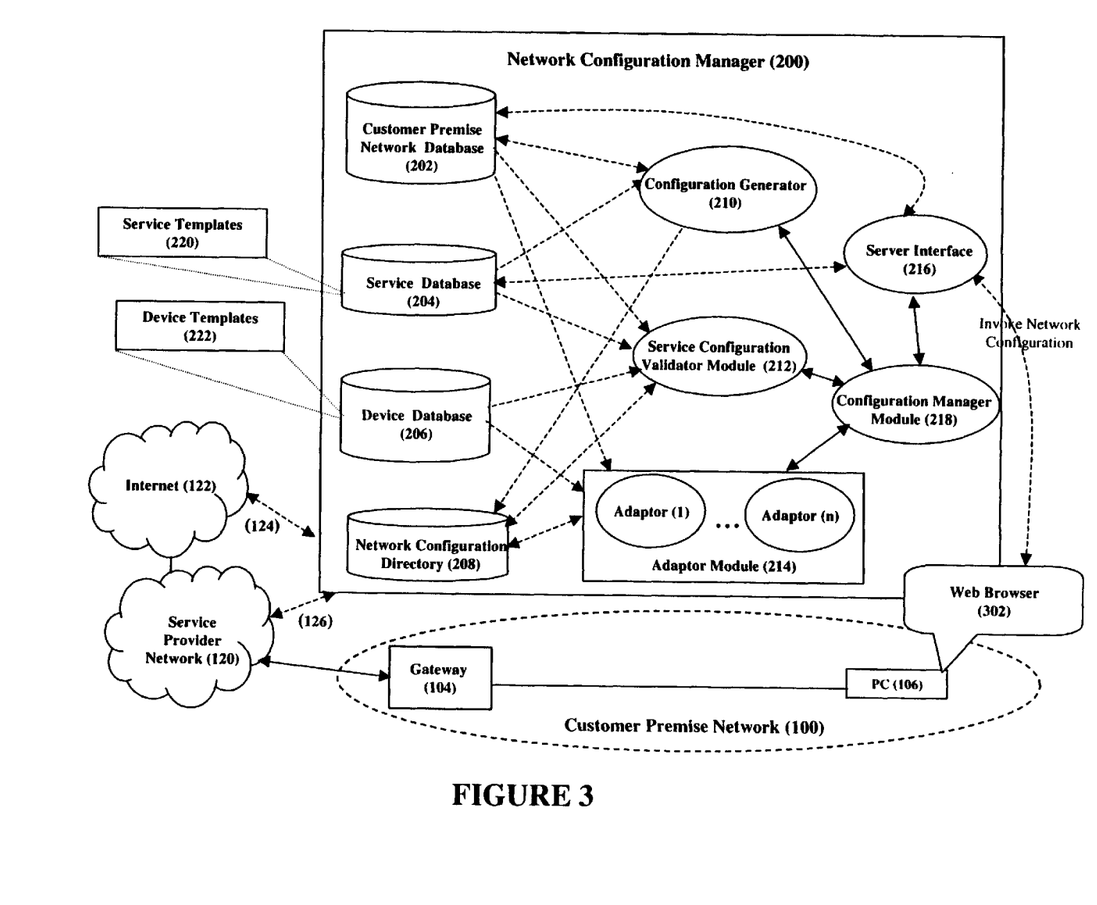
FIG. 3 depicts a first arrangement wherein a user initiates through the use of a web browser network configuration for a new service utilizing our invention.
Figure 4:
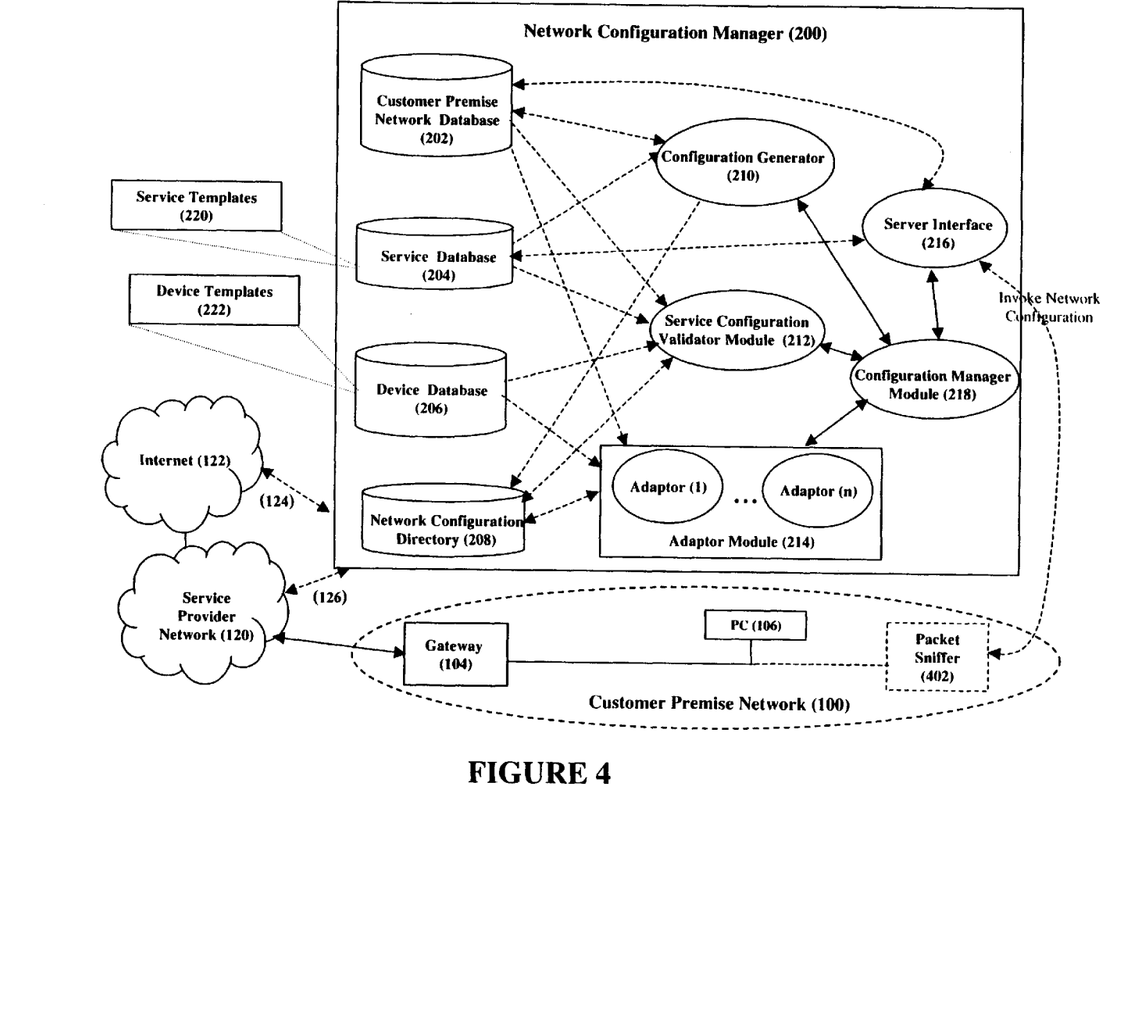
FIG. 4 depicts a second arrangement utilizing our invention wherein a packet sniffer within a customer premise network automatically initiates network configuration for a new service when the packet sniffer first detects the presence of that service.
Figure 5:
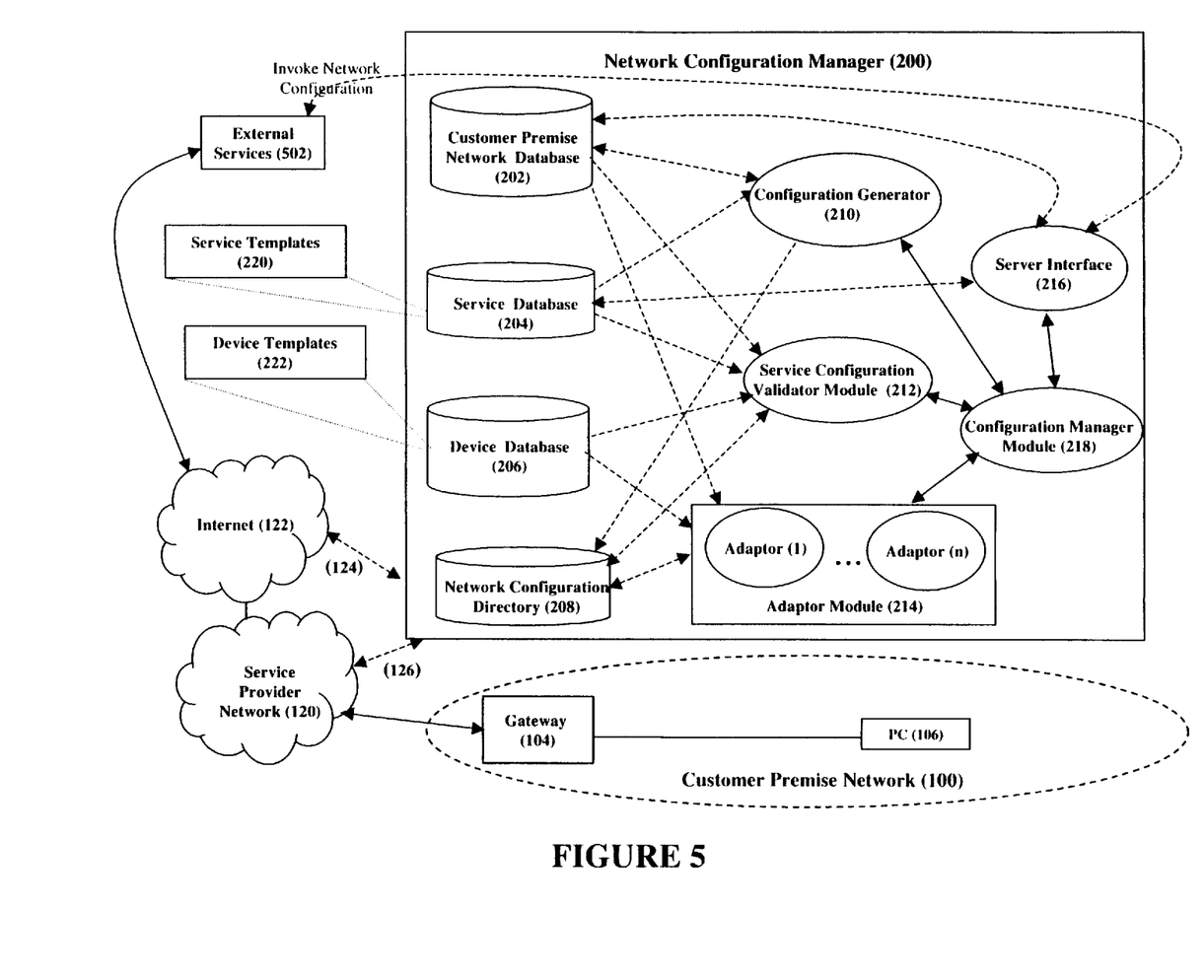
FIG. 5 depicts a third arrangement utilizing our invention wherein an external system automatically initiates customer premise network configuration for a new service when a user accesses the external system to run, install, or download that service.

Three specific embodiments of our invention are described below and are shown in FIGS. 3–5. Each of these embodiments can exist alone, or in combination with the others.

FIG. 3 shows a first embodiment of our invention where a user, through a web browser 302, manually initiates network configuration. This embodiment can be used when a user installs a server-based service (e.g., web server, FTP, etc.) or a peer-to-peer based service (e.g., video conferencing or multi-player game). Under this embodiment, the user accesses the server interface 216 through a web browser 302, requesting network configuration. In response to this request, the server interface accesses the service database 204 to determine the services the network configuration manager is capable of configuring. In addition, the server interface accesses the customer premise network database 202 to determine the devices 106–112 within the network 100. Both the determined services and devices are provided to the user through the web interface as menu options. In response, the user selects the service to enable and the specific user device on which this service will execute.

In response to the user's selections, the server interface accesses the customer premise network database 202 and first verifies that the requested service is not already enabled for the customer premise network. If the service is already enabled, the user is notified and the configuration is complete. If the service is not enabled, the server interface updates the customer premise network database with the new service, and then invokes the configuration manager 218 to control the workflow execution of the network configuration. The configuration manager begins by invoking the configuration generator 210. The configuration generator accesses the service database 204 to obtain the service template 220 for the requested service and using this service template, derives vendor-neutral device-configurations required to enable the selected service (e.g., NAT port forwarding configurations, firewall configurations, and host device configurations). Upon completion, the configuration generator places the derived configuration settings in a temporary location within the network configuration directory 208 for the specific user.

The configuration manager next invokes the service configuration validator module 212 to validate the network for the currently selected service. Network validation covers at least three verifications. First, the service configuration validator verifies that the configuration settings for the newly requested service do not conflict with the configuration settings for priorly enabled services. To perform this validation, the service configuration validator queries the customer premise network database 202 and determines the list of services enabled for the customer premise network 100. Using this list of services, the service configuration validator accesses the service database 204 and obtains the corresponding service templates 220. Next, the service configuration validator accesses the network configuration directory 208 and obtains the temporary vendor-neutral device-configuration settings for the currently requested service and the configuration settings for priorly enable services for network 100. Using this information, the service configuration validator verifies that all service requirements as specified by the service templates 220 are true/met given the particular configuration settings as specified by the device configuration settings obtained from the network configuration directory 208. Methods for performing validation of the configuration settings are described in Sanjai Narain's U.S. patent application Ser. No. 09/966,136, filed Sep. 28, 2001. The configuration generator will attempt to correct the configuration settings if it determines that the service requirements, as specified by the service templates, are not met.

Second, the service configuration validator verifies that the customer premise network can be configured for the requested service. Specifically, the service configuration validator accesses the customer premise network database 202 to determine the specific devices within the customer premise network 100 and accesses the device database 206 to obtain the device templates for these devices. Using this information and the generated vendor-neutral device-configuration settings, the service configuration validator verifies that the network devices can be configured for the requested service.

Third, the service configuration validator may also remotely access probes within the network devices 104–112 (the probes are not shown in the figures), which probes can determine, for example, if the user has installed an application corresponding to the requested service or if required ports are enabled on PC 106 or gateway 104. If the service configuration validator 212 is unable to correct the configurations or determines a configuration issue, the service is removed from the customer premise network database 202 and the service interface 216 notifies the user via the web interface 302 that the configuration has failed.

If the service configuration validator determines that the service requirements are met, the configuration manager triggers the adaptor module 214 to perform the actual configurations of the network 100 devices. Again the configurations determined thus far by the network configuration manager 200 are device-neutral configurations for varying device types. The adaptor 214 is responsible for translating a device-neutral configuration for a particular device type to a format appropriate for a specific vendor's device 104–112 and for then communicating with that device to perform the configurations. Each type of vendor equipment therefore has a corresponding adaptor module 214 (1)–(n). Hence, the adaptor module 214 accesses the customer premise network database to determine the specific devices 104–112 within the customer premise network 100, accesses the device database to obtain the device templates to determine how to configure these devices, and accesses the network configuration directory to obtain the temporary vendor-neutral device-configuration settings for the current service. The adaptor module then determines the specific adaptors 214 (1)–(n) needed to enable the network to the new service. Each adaptor translates the vendor neutral configuration information to a format appropriate for the particular vendor—s device 104–112 to which it is associated and then interfaces with the specific device through the device's configuration inrerface/capabilities (e.g., SNMP or HTTP protocol). Once each adaptor has finished, the adaptor module 21 updates the network configuration directory 208 by merging the temporary vendor-neutral device-configuration settings with the prior configurations. The service interface 216 then notifies the user that the configuration is complete. As is further described below in a second embodiment of our invention, the service interface 216 may also update a packet sniffer 402 associated with the customer premise network 100 such that the packet sniffer will not detect the newly enabled service.

FIG. 4 shows a second embodiment of our invention where network configuration is automatically initiated when a user begins using a new service. This embodiment applies to cases where a user begins executing a new peer-to-peer based service. A packet sniffer 402 that monitors all network traffic emanating from within the network 100 initiates the network configuration. The packet sniffer is situated within the network 100 (behind any firewall/NAT functionality) and can be located on the gateway 104 or another user device, such as a PC 106. The packet sniffer "watches" for the transmission of IP packets that are unique to a particular service (e.g., specific port numbers and/or specific protocols). Upon detecting a new service, the packet sniffer notes the source host (as determined by the IP source address in the detected IP packet) and invokes a request to the server interface 216 to configure the network 100 for the specific service. The packet sniffer 402 also updates its filters to ignore further packets pertaining to the service.

Upon receiving the request, the server interface 216 accesses the customer premise network database 202 to ensure the network has not been priorly enabled for the requested service. If the network has already been enabled, the configuration is complete. If the network has not been enabled, the configuration proceeds as in the first embodiment, with the configuration generator 210 deriving vendor-neutral device-configurations and the service configuration validator 212 performing network validation for the new service, etc.

If the configuration validator determines that the new configuration settings are incorrect, the newly entered service is removed from the customer premise network database 202 and the service interface 216 may also notify the packet sniffer 402 to update its filters such that future packets from the service are again detected. If the configuration validator 212 determines that the new configuration settings are correct, the configuration manager triggers the adaptor module 214 to configure the network 100 and to update the network configuration directory 208 with the new configuration settings.

FIG. 5 shows a third embodiment of our invention where a system 502 external from the network 100 automatically initiates network configuration when a user accesses the external system 502 to run, install, or download a new service to a user device, such as PC 106. The external system 502 can include an application server, a download site, etc. Upon receiving a request from a user device, the external system initiates a request to the server interface 216 for network configuration. The request includes the user device that requested the service from the external system 502, the name of the service, and a service template (making the assumption that the home network manager is not capable of configuring the specified service). In response to the request, the server interface 216 accesses the customer premise network database 202 to ensure the network 100 has not been priorly enabled for the specified service. If the network has already been enabled, the configuration is complete. If the network has not been enabled, the server interface updates the customer premise network database 202 with the new service and then accesses the service database 204 for the list of available services that the network configuration manager is capable of configuring. If the specified service is not on this list, the server interface 216 adds the specified service and stores the service template provided by the external server, thereby enabling the system to enable this service for future user requests. Configuration then proceeds as in the first embodiment, with the configuration generator 210 deriving vendor-neutral device-configurations and the service configuration validator 212 performing network validation for the new service, etc.

If the configuration validator determines that the new configuration settings are incorrect, the newly entered service is removed from the customer premise network database 202 and the server interface notifies the external server 502 to abort the requested download/install. If the configuration validator determines that the new configuration settings are correct, the configuration manager triggers the adaptor module 214 to configure the network 100 and to update the network configuration directory 208 with the new configuration settings. The server interface may also notify a packet sniffer 402 associated with the network such that the packet sniffer will not detect the newly enabled service, and then notifies the external server 502 to proceed with requested download/install.

In addition to enabling customer premise network for a service, the network configuration manager 200 can also disable a network for a specific service by removing the configuration settings that enabled that service. For example, a user can initiate this action through a web interface or the network configuration manager 200 can maintain service timers for each user, automatically disabling a service when a timer expires. Upon receiving an indication to disable a service, the server interface 216 updates the customer premise network database 202 to remove the specified service. The configuration manager then invokes the service configuration generator 212 to derive vendor-neutral device-configurations for the service to be disabled and triggers the adaptor module 214 to reconfigure the network 100 and to update the network configuration directory 208 to remove the configuration settings. The configuration manager may also invoke the configuration validator 212 to ensure the configuration settings resulting from the removal of the service are correct. Lastly, the server interface may notify a packet sniffer 402 within the network 100 to update its filters such that future packets from the service are again detected.

Advantageously, our inventive network configuration manager performs end-to-end configuration management of a customer premise network to completely enable a new service. Our inventive configuration manager also validates new network configurations to ensure these configurations do not conflict with or invalidate priorly enabled service configurations. In addition, our inventive configuration manager is vendor-neutral, utilizes existing configuration interfaces provided by vendor equipment, and resides external to the customer premise network. These advantages allow our system to configure diverse vendor equipment, to configure devices in the external public network, and to configure customer premise networks without requiring users to have to install additional management software and components.

The above-described embodiments of our invention are intended to be illustrative only. Numerous other embodiments may be devised by those skilled in the art without departing from the spirit and scope of our invention.

We claim:

1. A system for configuring a network to enable a service, said system comprising:
   a plurality of service templates, each template describing end-to-end network requirements needed to enable its corresponding service,
   a configuration generator that generates vendor-neutral device-configuration settings from the service template corresponding to the service to be enabled,
   a configuration validator that validates the network by determining if the vendor-neutral device-configuration settings corresponding to the service to be enabled meet the end-to-end network requirements as specified by the service templates corresponding both to the service to be enabled and to services priorly enabled for the network, and
   an adaptor module that translates the vendor-neutral device-configuration settings generated by the configuration generator to vendor-specific device-configuration settings and that conveys the vendor-specific device-configuration settings to the network to enable the service.

2. The system of claim 1 wherein said system further comprises a web interface for accepting a request to configure the network to enable the service.

3. The system of claim 1 further comprising a packet monitor that, upon detecting an IP packet emanating from the network related to the service to be enabled, invokes the system to configure the network.

4. The system claim 1 further comprising a server interface for accepting a request to configure the network from a server external to the network.

5. The system of claim 1 further comprising a network configuration directory that stores vendor-neutral device-configuration settings for all services priorly enabled for the network.

6. The system of claim 5 wherein the configuration validator further validates the network by determining if the vendor-neutral device-configuration settings corresponding to the services priorly enabled for the network meet the end-to-end network requirements as specified by the service templates corresponding both to the service to be enabled and to the services priorly enabled for the network.

7. The system of claim 6 wherein the configuration validator attempts to correct the vendor-neutral device-configuration settings if the network requirements as specified by the service templates are not met.

8. The system of claim 1 further comprising a plurality of device templates, wherein a device template provides capabilities of a particular vendor-device, and wherein the configuration validator further validates the network by determining if devices that comprise the network can be configured for the service by comparing the vendor-neutral device-configuration settings generated by the configuration generator to the device templates for these devices.

9. The system of claim 1 wherein:
   the configuration generator also generates vendor-neutral device-configuration settings from the service template corresponding to a service to be disabled, and the adaptor module translates the vendor-neutral device-configuration settings for the service to be disabled to vendor-specific device-configuration settings and also conveys these device-configuration settings to the network for service disablement.

10. A method for configuring a network to enable a service, said method comprising the steps of:

obtaining a service template from a plurality of service templates for the service to be enabled wherein each service template describes end-to-end network requirements needed to enable its corresponding service, using the obtained service template to generate vendor-neutral device-configuration settings for the service to be enabled, validating the network for the service to be enabled by determining if the vendor-neutral device-configuration settings corresponding to the service to be enabled meet the end-to-end network requirements as specified by the service templates corresponding both to the service to be enabled and to services priorly enabled for the network, translating the generated vendor-neutral device-configuration settings to vendor-specific device-configuration settings, and communicating the vendor-specific device-configuration setting to the network to enable the service.

11. The method of claim 10 further comprising the step of receiving a request through a web interface to configure the network to enable the service.

12. The method of claim 10 further comprising the step of receiving a request to configure the network based upon a detected IP packet emanating from the network related to the service to be enabled.

13. The method of claim 10 further comprising the step of receiving a request to configure the network from a server external to the network wherein the server generates the request upon receiving an access from the network.

14. A method for configuring a network to enable a service, said method comprising the steps of:

receiving a request to configure the network from a server external to the network wherein the server generates the request upon receiving an access from the network, in response to receiving the request, obtaining a service template from a plurality of service templates for the service to be enabled wherein each service template describes end-to-end network requirements needed to enable its corresponding service and wherein the obtained service template is received from the server along with the request, using the obtained service template to generate vendor-neutral device-configuration settings for the service to be enabled, validating the network for the service to be enabled and the services priorly enabled, translating the generated vendor-neutral device-configuration settings to vendor-specific device-confirmation settings, and communicating the vendor-specific device-configuration setting to the network to enable the service.

15. The method of claim 10 wherein the network validation further comprises the steps of:

obtaining vendor-neutral device-configuration settings for all services priorly enabled for the network, and determining if the obtained vendor-neutral device-configuration settings for the services priorly enabled for the network meet the end-to-end network requirements as specified by the service templates corresponding both to the service to be enabled and to the services priorly enabled for the network.

16. The method of claim 15 further comprising the step of correcting the vendor-neutral device-configuration settings if the service requirements as specified by the service templates are not met.

17. The method of claim 10 wherein the network validation further comprises the steps of:

obtaining device templates from a plurality of device templates for each device that comprises the network, wherein a device template provides capabilities of a particular vendor-device, and determining if the device comprising the network can be configured for the service by comparing, the vendor-neutral device-configuration settings for the service to the obtained device templates.

18. The method of claim 10 wherein the generated vendor-neutral device-configuration settings include a setting for a system external to the network, said method further comprising the steps of:

translating the vendor-neutral device-configuration setting for the system to a vendor-specific device-configuration setting for the system, and communicating the vendor-specific device-configuration setting for the system to the system to enable the service.

* * * * *